United States Patent

Carbon et al.

[11] 3,722,959
[45] Mar. 27, 1973

[54] HUB SHELL ASSEMBLY FOR A BICYCLE AND METHOD OF MAKING THE SAME

[75] Inventors: Theo Carbon; Reinhard Kessler, both of Schweinfurt am Main, Germany

[73] Assignee: Frichtel & Sachs AG, Schweinfurt, Germany

[22] Filed: Dec. 22, 1970

[21] Appl. No.: 100,703

[30] Foreign Application Priority Data

Jan. 8, 1970   Germany....................P 20 00 680.8

[52] U.S. Cl. ..............................301/105 B, 29/159.3
[51] Int. Cl. ............................................B60b 27/04
[58] Field of Search...................301/105 B; 29/159.3

[56] References Cited
UNITED STATES PATENTS

| | | | |
|---|---|---|---|
| 555,932 | 3/1896 | Curtis | 301/105 B |
| 1,609,380 | 12/1926 | Murray | 29/159.3 |
| 1,693,067 | 11/1928 | Williams | 29/159.3 |
| 3,082,042 | 3/1963 | Liebreich | 301/105 B |

FOREIGN PATENTS OR APPLICATIONS 475,722   3/1915   France ..............................301/105

*Primary Examiner*—Richard J. Johnson
*Attorney*—Kelman & Berman

[57] ABSTRACT

A hub shell for a bicycle wheel is assembled from two approximately semicylindrical sheet steel stampings by butt welding the axial edges of the stampings, machining the blank so produced to desired dimensions and details of sleeve contour, mounting annular flanges for the spokes on knurled outer faces of the sleeve, and deforming the exposed knurls to secure the flanges in position.

2 Claims, 3 Drawing Figures

Patented March 27, 1973 3,722,959

INVENTORS.

HUB SHELL ASSEMBLY FOR A BICYCLE AND METHOD OF MAKING THE SAME

This invention relates to hub shells for wheels of bicycles and like vehicles, and particularly to a hub shell assembly and to a method of making the same.

In its more specific aspects, the invention is concerned with the hub shell for the rear or driven wheel of a bicycle or like vehicle which may contain a multiple speed transmission, a brake, and other relatively complex elements, and must be shaped to provide proper support for the enclosed devices.

It is not economical to machine a hub shell from solid bar stock because of the cost of labor and material. It is also expensive to shape a hub shell from seamless tubular stock and to attach flanges for the spokes. The most inexpensive method of making hub shells available heretofore involves the assembly of the hub shell from two axial sections which are first forged from rod material into annular shapes, thereafter press formed at ambient temperature, and welded to each other along a circumferential seam. The tubular blank so obtained is filled with a hardening composition and axially sealed, and thereafter subjected to heat treatment in which the inner surfaces are carburized whereas the flanges on the outer surface remain relatively ductile as required for proper distribution of the tensile stresses transmitted by the spokes.

The last described method is still relatively costly because much more material enters the process than that ultimately found in the hub shell. The method is also limited to low-carbon steel if the power requirements and tool wear in the initial shaping stages, particularly during cold forming, are to be held within reasonable limits.

It is a primary object of this invention to provide a method of making a hub shell assembly which is less expensive than even the last-described known process, and a hub shell assembly which can be made by the method.

With these objects and others in view, as will hereinafter become apparent, the invention in one of its aspects resides in a hub shell assembly for a bicycle or like vehicle which includes a shell member of substantially circular cross section at right angles to its axis and essentially consisting of a plurality of metallic bodies and welded seams connecting the bodies. The hub shell sleeve of the invention differs from the last-described known shell arrangement in that each of the metallic bodies extends about the axis in an arc of much less than 360° and has two angularly spaced edge portions which extend over substantially the entire axial length of the shell member in a plane through the axis. Each welded seam connects respective edge portions of two such bodies, and therefore also extends in a plane through the axis.

The afore-described hub shell assembly is made by a method in which metallic bodies substantially circularly arcuate about respective axes are shaped in such a manner that each shaped body is bounded circumferentially relative to the axis thereof by edges which extend over substantially the entire axial length of the body in a plane through the axis. The bodies so shaped are juxtaposed in a position in which the axes thereof substantially coincide, and the bodies jointly extend in a closed or almost closed circle about the coinciding axes while respective edges of each pair of juxtaposed bodies are contiguously adjacent each other. These contiguously adjacent edges are then welded to each other so as to connect the several bodies into a tubular blank which may then be processed in a conventional manner.

Other features and many of the attendant advantages of this invention will readily be understood from the following detailed description of a preferred embodiment when considered in connection with the appended drawing in which.

Figure 1:
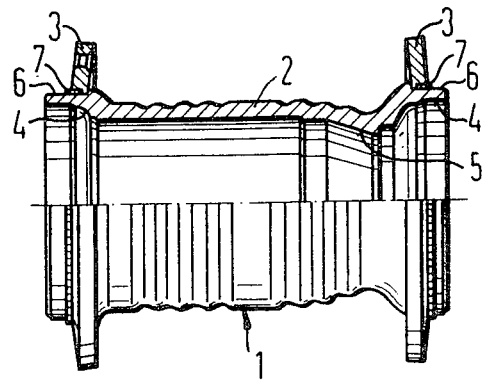
FIG. 1 shows a finished hub shell assembly of the invention partly in rear elevation, and partly in section on its axis.

The completed hub shell 1 shown in FIG. 1 consists of two metallic bodies 2 and welded seams which connect the bodies, but are not visible in the finished hub shell. The hub shell is normally connected with a wheel rim by wire spokes in a manner conventional and not illustrated. The non-illustrated spokes are attached to annular radial flanges 3 near the axial ends of the hub shell, the ends of the spokes being received in circumferentially distributed openings of the flanges.

The shell member of the assembly has annular bulges 4 at its ends which provide outer rings or races for ball bearings in the assembled hub. The cross section in the shell member is approximately uniform in the axially central portion thereof and increases toward both axial ends, a restricted annular portion 5 being formed intermediate the central portion and one of the bulging axial ends. As a whole, the shell member is of circular cross section in all planes perpendicular to its axis.

Two cylindrical shoulders 6 are formed on the axially terminal parts of the outer shell face, and the shoulders are provided with knurls 7 partly covered by the flanges 3. Where not covered by the flanges 3, the knurls are deformed so as axially to secure the flanges 3. The flanges are conically dished in such a manner that they converge in a direction radially away from the hub shell.

The entire hub shell 1 consists of ferrous metal coated with an electrodeposit of nickel which conceals the welded seams and is too thin to permit pictorial representation on the scale of FIG. 1.

Figure 2:
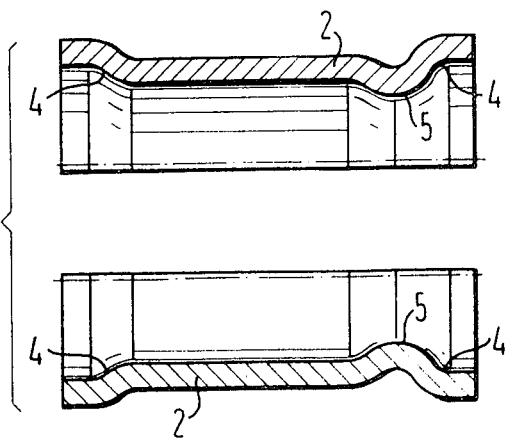
FIG. 2 illustrates the two metallic bodies from which the shell member of the assembly of FIG. 1 is made in section on their respective axes of curvature.
Figure 3:
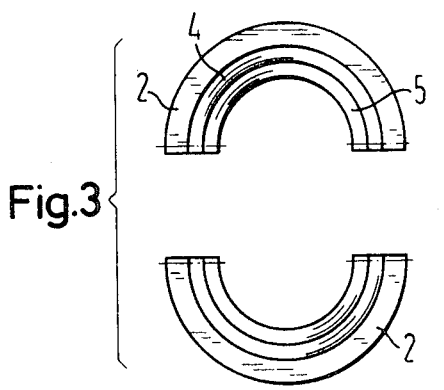
FIG. 3 shows the bodies of FIG. 2 in side elevation.

In making the hub shell assembly seen in FIG. 1, two pieces 2 of steel sheet or plate are hot forged and/or stamped on a power press into the shapes seen in FIGS. 2 and 3 in which the pieces are of practically semicircular cross section about respective axes and have each two edge portions which are spaced approximately 180° apart. These edge portions extend each over the entire, or practically the entire axial length of the bodies 2.

Each body 2 approximately duplicates the features described with reference to the finished hub shell 1. The axially central portion of each body 2 is of substantially uniform cross section, and the cross section is greatest in the axially terminal bulges 4 and smallest in the restricted portion 5.

To form a tubular blank, the two bodies 2 are juxtaposed in butting relationship of their circumferentially bounding axial edges so that their axes of curvature coincide, and the two bodies extend in a substantially closed circle about the coinciding axes. The butting edges are then welded to each other in a conventional manner.

The tubular weldment so obtained is subjected to secondary machining operations for smoothing its outer face and shaping details of its inner face to close tolerances required for cooperation with the hub elements enclosed in the completed hub, and not directly relevant to this invention. The shoulders 6 and other annular features are produced by lathe turning, and the knurls 7 by milling.

After completion of the machining operations, which remove only little metal, the inner faces of the bulges 4 and of the restriction 5 are hardened by carburizing to provide races for ball bearings in the bulges 4 and a conical engagement face for a drive conus on the restriction 5. The separately stamped unitary flanges 3 are slipped over the shoulders 6 on the knurls 7, and the latter are deformed where not covered by the flanges so as axially to secure the flanges against annular projections left standing on the blank during machining.

The completed assembly may then be given a smooth surface finish and thereafter nickel plated to produce the hub shell 1 seen in FIG. 1.

The approximately semicylindrical bodies 2 are shaped much more easily than the annular sections from which hub shell members were assembled by welding heretofore. The straight welded seams used according to the invention are more easily made than the arcuate seams of the prior art.

While the invention has been illustrated by an embodiment in which only two metallic bodies are assembled in a shell blank by welded seams located in a common plane through the axis, more than two bodies may be connected in an analogous manner, each of the bodies extending about its axis of curvature in an arc substantially smaller than 360° and being connected to a circumferentially juxtaposed body by a straight weld located in a plane through the hub axis. The cost of the greater number of welded seams, however, is not always balanced by the savings achieved in stamping or otherwise shaping the metallic bodies extending in shorter, generally circular arcs about their respective axes.

The relatively simple shaping operations required for producing the metallic bodies may be performed on steel containing enough carbon to make a separate hardening of the ball bearing races and other surfaces unnecessary.

Only very little steel is removed during the secondary machining operations because the bodies 2 are initially shaped to approximate respective portions of the ultimate hub shell configuration. Some machining, however, cannot normally be avoided, and is done prior to localized hardening or carburizing, if any. The metallurgical properties of the flanges 3 are not affected by the processing of the shell blank, and may be selected to withstand the stresses of the spokes which normally act in the direction of convergence of the flanges 3. The axial components of these forces are directed generally toward the annular projections of the shell member so that the deformed knurls are adequate for holding the flanges in position. Alternatively, the flanges may be soldered to the knurled or smoothly cylindrical shoulders 6.

It should be understood, of course, that the foregoing disclosure relates only to a preferred embodiment of the invention, and that it is intended to cover all changes and modifications in the example of the invention chosen herein for the purpose of the disclosure which do not depart from the spirit and scope of the invention set forth in the appended claims.

What is claimed is:

1. In a hub shell assembly for a bicycle and like vehicle, in combination:
   a. a shell member having an axis and being of substantially circular cross section at right angles to said axis,
      1. said shell member essentially consisting of two metallic bodies having each two axial edge portions abuttingly engaging the corresponding edge portions of the other body, and welded seams connecting the engaged edge portions,
      2. said cross section being substantially uniform in an axially central portion of said shell member, and substantially greater in the axially terminal portions of said shell member, said terminal portions bulging so that the inner faces thereof constitute races for bearing balls,
      3. said shell member being formed with a restricted annular portion axially interposed between said central portion and one of said terminal portions and having a conical engagement face; and
   b. two annular flange members secured to said shell member in axially spaced relationship and projecting beyond said terminal portions in a radially outward direction.

2. In an assembly as set forth in claim 1, said inner faces of said terminal portions and said conical face of said restricted portion having a hardness greater than that of said central portion.

* * * * *